United States Patent
Stuhlfauth (10) Patent No.: US 12,546,808 B2
(45) Date of Patent: Feb. 10, 2026

(54) TEST SYSTEM AND TEST METHOD

(71) Applicant: Rohde & Schwarz GmbH & Co. KG, Munich (DE)

(72) Inventor: Reiner Stuhlfauth, Landau (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 638 days.

(21) Appl. No.: 17/964,468

(22) Filed: Oct. 12, 2022

(65) Prior Publication Data

US 2024/0125833 A1   Apr. 18, 2024

(51) Int. Cl.
| | |
|---|---|
| *G01R 29/10* | (2006.01) |
| *H01Q 15/14* | (2006.01) |
| *H04B 7/06* | (2006.01) |

(52) U.S. Cl.
CPC .......... *G01R 29/10* (2013.01); *H01Q 15/148* (2013.01); *H04B 7/0617* (2013.01)

(58) Field of Classification Search
CPC ..... G01R 29/10; H01Q 15/148; H04B 7/0617
See application file for complete search history.

(56) References Cited

U.S. PATENT DOCUMENTS

| | | | | |
|---|---|---|---|---|
| 6,346,693 | B1 * | 2/2002 | Kasevich | H05B 6/642 |
| | | | | 219/757 |
| 9,794,009 | B1 * | 10/2017 | Olgaard | H04B 17/15 |
| 11,131,701 | B1 * | 9/2021 | Mathis | G01R 29/105 |
| 11,133,854 | B1 * | 9/2021 | Pratt | H04B 7/0639 |
| 12,425,075 | B2 * | 9/2025 | Chi | H04B 7/04013 |
| 2003/0064683 | A1 * | 4/2003 | Matthews | H04B 17/40 |
| | | | | 455/67.11 |
| 2017/0256861 | A1 * | 9/2017 | Emmanuel | H04B 7/145 |
| 2020/0096547 | A1 * | 3/2020 | Orozco Valdes | G01R 29/0892 |
| 2022/0059943 | A1 * | 2/2022 | Saab | H04B 7/0617 |
| 2023/0408677 | A1 * | 12/2023 | Duan | G01S 13/878 |
| 2023/0421412 | A1 * | 12/2023 | Zegrar | H04B 7/0888 |
| 2024/0168072 | A1 * | 5/2024 | Haile | G01R 29/10 |
| 2024/0201241 | A1 * | 6/2024 | Moreira | G01R 29/10 |
| 2024/0259050 | A1 * | 8/2024 | Li | H04B 7/04013 |
| 2024/0429624 | A1 * | 12/2024 | Patel | H01Q 25/001 |

FOREIGN PATENT DOCUMENTS

WO   2022049112 A1   3/2022

* cited by examiner

*Primary Examiner* — Yuwen Pan
*Assistant Examiner* — Swati Jain
(74) *Attorney, Agent, or Firm* — Patterson + Sheridan, LLP (57) ABSTRACT

The present disclosure provides a test system for testing a device under test, the test system comprising at least one measurement application antenna, and a Reconfigurable Intelligent Surface, RIS, reflector configured to reflect an incoming signal that impinges on the RIS reflector with a predefined impinging angle as reflected signal with a predefined outgoing angle, and a measurement application device coupled to the measurement application antenna and configured to qualify beamforming characteristics of the device under test based on RF signals exchanged between the measurement application device and the device under test via the at least one measurement application antenna and the RIS reflector. Further, the present disclosure provides a respective test method.

23 Claims, 7 Drawing Sheets

TEST SYSTEM AND TEST METHOD

TECHNICAL FIELD

The disclosure relates to a test system and a respective test method.

BACKGROUND

Although applicable to any type of antenna measurement application, the present disclosure will mainly be described in conjunction with beam forming antennas.

In modern communication systems beamforming antennas may be used to emit RF signals. Such beamforming antennas may be configured to emit RF signals with a static beam pattern or with configurable or variable beam patterns.

Accordingly, there is a need for testing beam patterns of RF signals emitted by beamforming antennas.

SUMMARY

The above stated problem is solved by the features of the independent claims. It is understood, that independent claims of a claim category may be formed in analogy to the dependent claims of another claim category.

Accordingly, it is provided:

A test system for testing a device under test, the test system comprising at least one measurement application antenna, and a Reconfigurable Intelligent Surface, RIS, reflector configured to reflect an incoming signal that impinges on the RIS reflector with a predefined impinging angle as reflected signal with a predefined outgoing angle, and a measurement application device coupled to the measurement application antenna and configured to qualify beamforming characteristics of the device under test based on RF signals exchanged between the measurement application device and the device under test via the at least one measurement application antenna and the RIS reflector.

Further, it is provided:

A test method for testing a device under test, the test method comprising configuring a Reconfigurable Intelligent Surface, RIS, reflector to reflect an incoming signal that impinges on the RIS reflector with a predefined impinging angle as reflected signal with a predefined outgoing angle, and qualifying beamforming characteristics of the device under test based on RF signals exchanged between a measurement application device and a device under test via at least one measurement application antenna and the RIS reflector.

The present invention is based on the finding that in modern communication systems, like satellite based communication systems, the beamforming performed in satellites, in receiving and transmitting direction, needs to have a very high quality i.e., needs to produce beams with a very well defined shape and directivity.

For example, with a low earth orbit, LEO, satellite that is usually positioned about 300 km-1500 km above the earth, very small variations of the beam main direction may result in large misplacements of the area covered by the respective beam. With a LEO satellite with an altitude of 1000 km, a beam pointing mismatch of only 0.1° will result in a beam peak or beam center deviation of about 3.5 km.

Currently it is very difficult to fully qualify the beamforming capabilities of a device under test, like a satellite, in transmitting and receiving direction. For example, very complex test setups are required to determine beam forming characteristics of such a device under test.

With the solution provided in the present disclosure testing or qualifying beamforming capabilities of devices under test, especially devices that transmit or receive RF signals using beamforming, is possible with a very simple test setup.

To this end, the present disclosure provides the test system for testing a device under test, like a satellite with beamforming capabilities.

When in this disclosure it is stated that a device under test has beamforming capabilities, it is understood that these beamforming capabilities may be present in the device under test in receiving or transmitting direction. It is further understood, that these beamforming capabilities may be static beamforming capabilities, or variable or controllable beamforming capabilities.

A device under test may for example comprise an antenna that allows the device to transmit or receive RF signals with a fixed beampattern. Another device under test may in contrast comprise a configurable beamforming antenna, for example an array antenna, that allows the device under test to transmit or receive RF signals with one or more configurable beam patterns.

Possible devices under test may comprise, but are not limited to, satellites for with communication interfaces, like NTN (Non-Terrestrial-Network) satellites, RF communication equipment, like antennas for cellular base stations or UEs (also called user equipment), and antennas with beamforming characteristics or capabilities for any other application, for example radar antennas. Such devices may comprise antennas that may steer beams of specific shapes in specific directions. Exemplary satellite antennas may, for example, allow to emit beams with an angle between 0° and 70°.

The test system comprises at least one measurement application antenna for exchanging i.e., receiving or transmitting, RF signals. The at least one measurement application antenna is coupled to a measurement application device that may receive signals, especially RF signals, via the measurement application antenna, or transmit signals, especially RF signals, via the at least one measurement application antenna.

It is understood, that a single measurement application device may be provided for each one of multiple measurement application antennas, if more than one measurement application antenna is provided in the test system. In embodiments, a single measurement application device may be provided for multiple measurement application antennas. Such a single measurement application device may comprise a respective signal port for each one of the measurement application antennas.

The measurement application antenna may comprise a highly directive antenna, like a horn antenna. It is understood, that other types of antennas may also be used. In embodiments, the measurement application antenna may be provided with an optional reflector between the measurement application antenna and the RIS reflector.

In order to qualify the device under test, especially the beamforming characteristics of the device under test, the test system further comprises a RIS reflector.

The term RIS or Reconfigurable Intelligent Surface refers to a surface with configurable impedances over the surface area which leads to the surface exhibiting a reflectivity that is based on the configurable impedances i.e., a configurable reflectivity. By configuring the reflectivity of different areas of the RIS, the RIS acts similar to an active beamforming antenna by reflecting the impinging signal at different zones or areas of the RIS with different delays. A RIS, consequently, reflects an incoming beam into a configurable direction, similar to a beamforming antenna generating a beam in a specific direction. A RIS may also be called or form a meta surface. The single zones or areas of the RIS that may be individually configured may also be called meta atoms. The single meta atoms may in exemplary embodiments comprise a square shape with an edge length of about $\lambda/5$ of the relevant frequency, or a round shape with a diameter of about $\lambda/5$ of the relevant frequency.

Since each one of the meta atoms may be individually configured, a single RIS reflector may comprise different zones that direct or reflect an incoming beam in different directions.

In the test system, the RIS reflector is used to reflect incoming signals with a predefined impinging angle as reflected signals with a predefined outgoing angle.

In the test system, the RIS reflector and the at least one measurement application antenna may be positioned at fixed positions i.e., with a fixed relative position to each other.

With such an arrangement, the RIS reflector may be configured to reflect a signal that is incoming with a specific impinging angle from a device under test that is positioned at a specific position to a specific measurement application antenna.

In an exemplary test system, the device under test may be provided in a test chamber. In the test chamber a respective fixation mechanism may be provided for the device under test that fixes the device under test in a predetermined position and with a predetermined orientation. Of course, such a fixation mechanism may be controllable to move the device under test into a respective position and/or orientation. It is understood, that the expression "test chamber" may comprise, but is not limited to, small size test chambers for mobile user equipment to large test halls for devices like satellites or cellular base stations.

The device under test may then be initiated to emit RF signal. As indicated above, the device under test may comprise an antenna with static or fixed beamforming characteristics. Alternatively, the device under test may comprise an antenna with controllable beamforming characteristics.

For performing a test of the device under test, the device under test may be initiated to emit an RF signal in the direction of the RIS reflector. The RIS reflector may be configured to reflect the incoming or impinging signals to the measurement application antenna, and the measurement application device may receive the reflected signals via the measurement application antenna. The measurement application device may then qualify the beamforming characteristics of the device under test. The measurement application device may, for example, comprise a spectrum analyzer or a (vector) network analyzer.

The expression "qualify the beamforming characteristics" may refer to the measurement application device determining if the beamforming characteristics of the device under test meet specific criteria.

If the device under test is positioned at a specific relative position to the RIS reflector and the measurement application antenna, a beam steered toward the RIS reflector may be reflected by the RIS reflector to the measurement application antenna. If the device under test would inaccurately steer the beam with the RF signal in a wrong direction, the signal strength to be measured at the measurement application device would decrease. A possible criterium may, therefore, comprise but is not limited to a minimum signal strength of the reflected signal being measured at the measurement application device. If the determined signal strength is greater than the predetermined threshold, the beamforming characteristics of the device under test may be qualified as working or correct.

The test system may easily be adapted to different devices under test and different beam forming angles for the devices under test. To this end, the RIS reflector may simply be reconfigured to reflect the impinging signal as reflected signal with the required outgoing angle.

It is understood, that instead of receiving a RF signal via the RIS reflector and the measurement application antenna at the measurement application device, the test system may also be used to transmit a test signal via the measurement application antenna and the RIS reflector to the device under test. In such embodiments, the measurement application device may be provided as or may comprise a signal generation device, like an arbitrary signal generator, also called ARB generator, or a vector signal generator. Of course, the measurement application device may be coupled with a test port of the device under test to measure the test signal as received at the device under test. In addition, or as alternative, the device under test may comprise respective internal measurement units to measure the test signal as received in the device under test.

With the test system according to the present disclosure, beamforming communication devices may, therefore, easily be tested under different operating conditions.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the test system or the test method can be combined in all variations with each other and the disclosure of the description is not limited to the claim dependencies as specified in the claim set.

In an embodiment, which can be combined with all other embodiments of the test system mentioned above or below, the test system may comprise one measurement application antenna, wherein the RIS reflector may be configured to reflect the incoming signal as reflected signal towards the measurement application antenna when the incoming signal impinges onto the RIS reflector with a predetermined first angle.

As indicated above, in some measurement applications the device under test may be positioned at a fixed relative position to the RIS reflector and the measurement application antenna.

In such measurement applications, the RIS reflector may be configured to reflect an incoming signal to the measurement application antenna, if the incoming signal comes from the fixed position of the device under test.

A device under test positioned at the respective fixed position may, for performing a test, be controlled to emit an RF signal in the direction of the RIS reflector, especially with the main beam direction pointing to a specific zone or area of the RIS reflector.

In case that the device under test correctly generates such an RF signal, the RIS reflector will reflect the RF signal to the measurement application antenna that forwards the reflected and received RF signal to the measurement application device for evaluation.

In cases that the device under test does not generate the RF signal in a correct beam, the RF signal will not or only partially be reflected by the RIS reflector towards the measurement application antenna.

In embodiments, the device under test may be repeatedly positioned e.g., with a fixation mechanism as mentioned above. The device under test may be controlled to a emit a RF signal with a respective beamforming applied in each one of the positions, and the measurement application device may qualify the beamforming characteristics of the device under test for each one of the positions.

In embodiments, a respective test controller may be provided for controlling at least one of the fixation mechanism, the measurement application device, the RIS reflector, and the device under test when performing tests with the test system.

Such a test controller may be provided as a dedicated entity or may be integrated, for example, into the measurement application device.

The test controller may be provided as at least one of a dedicated processing element e.g., a processing unit, a microcontroller, a field programmable gate array, FPGA, a complex programmable logic device, CPLD, an application specific integrated circuit, ASIC, or the like. The test controller may at least in part also be provided as a computer program product comprising computer readable instructions that may be executed by a processing element. In a further embodiment, the test controller may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

The test controller may, for example, be capable of running a test program or executing a test sequence. Such a test program or test sequency may indicated which measurements are to be performed, how the RIS reflector is to be configured, and how the device under test is to be positioned. In embodiments, the test controller may comprise respective interfaces to at least some of the other elements of the test system and control these elements accordingly. In addition or as alternative, the test controller may comprise a user interface that may indicated for at least some of the elements of the test system how a user should operate the respective elements.

In a further embodiment, which can be combined with all other embodiments of the test system mentioned above or below, the measurement application device may be configured to receive the RF signals from the device under test via the RIS reflector and the respective measurement application antenna, and to qualify a beam directivity characteristic of the device under test based on the received RF signals.

The measurement application device in this embodiment may be a device capable of measuring the RF signal as reflected by the RIS reflector and received via the measurement application antenna. Such a measurement application device may for example comprise a spectrum analyzer or a (vector) network analyzer.

As indicated above, the measurement application device may receive the RF signals as emitted by the device under test via the RIS reflector and the measurement application antenna.

The measurement application device may then qualify for example a beam directivity characteristic i.e., the quality of the beamforming performed by the device under test, by evaluating the received RF signal.

As will be explained in more detail below, the measurement application device may, for example, determine the EIRP or the EVM for the RF signal for qualifying the beamforming characteristics of the device under test.

In another embodiment, which can be combined with all other embodiments of the test system mentioned above or below, the measurement application device may be configured to transmit the RF signals to the device under test via the RIS reflector and the respective measurement application antenna.

Instead of receiving the RF signal, the measurement application device may also emit a test signal as RF signal via the measurement application antenna. This signal may then be reflected by the RIS reflector to the device under test.

With this arrangement, it is possible to also test the device under test in receiving direction.

In an embodiment, which can be combined with all other embodiments of the test system mentioned above or below, the RIS reflector may comprise at least two reflection zones, wherein each one of the reflection zones is configured to reflect the incoming signal as reflected signal towards one measurement application antenna when the incoming signal impinges onto the respective reflection zone with a predetermined zone-specific angle.

As explained above, the RIS reflector may comprise a plurality of sections or areas that may be individually tuned and that may be called meta atoms. Since each one of these meta atoms may be individually tuned, multiple different reflection zones may be created on the RIS reflector.

The reflection zones may each be positioned at the impinging areas for specific beams that may be generated by the device under test while the device under test is at the same position. The reflection zones may, especially, be positioned in a non-overlapping fashion on the RIS reflector.

Such a RIS reflector allows testing different beam configurations of a device under test easily.

It is understood, that the term "reflection zone" of the RIS reflector may be interpreted as a single RIS reflector with different configured zones, or as two dedicated RIS reflectors that may be provided in the test system.

In another embodiment, which can be combined with all other embodiments of the test system mentioned above or below, the at least two reflecting zones may each be configured to reflect the incoming signal to the same measurement application antenna, wherein the measurement application device may be configured to receive the RF signals from the device under test via the RIS reflector and the respective measurement application antenna, and to qualify a beam sweeping characteristic of the device under test based on the received RF signals.

Each one of the reflection zones may be configured to reflect an impinging signal originating at a common predetermined position for all reflection zones to the same measurement application antenna. If a device under test is positioned at the respective position, and emits an RF signal in a respective beam to any one of the reflection zones, the RF signal will, therefore, be reflected to the measurement application antenna.

The device under test may with such a RIS reflector be controlled to direct the RF signal with a respective beam to one reflection zone after the other, while the measurement application device may qualify the beamforming characteristics of the device under test for each one of the reflection zones.

This arrangement may in embodiments be used to qualify not only single beams as emitted by the device under test. Instead, a beam sweeping performed by the device under test may also be qualified by controlling the device under test to sweep the beam from a first one of the reflection zones to a last one of the reflection zones via any intermediary reflection zones.

It is understood, that such a sweep may be step-wise e.g., from reflection zone to reflection zone, or seamless or continuous. In the case of a step-wise sweep, the measurement application device and the device under test may be controlled e.g., by the test controller, such that the measurement application device performs a measurement each time a respective beam is configured in the device under test.

In an embodiment, the multiple reflection zones may be implemented as a single moving reflection zone. Such a single moving reflection zone may move on the path of a beam that is seamlessly or continuously steered over the RIS reflector. This allows continuously qualifying the beam-forming characteristics of the device under test while the beam is actively steered in different directions.

In a further embodiment, which can be combined with all other embodiments of the test system mentioned above or below, the test system may comprise at least two measurement application antennas, wherein the at least two reflecting zones may each be configured to reflect the incoming signal to a different one of the at least two measurement application antennas, and wherein the measurement application device may be configured to receive the RF signals from the device under test via the RIS reflector and the respective measurement application antenna, and to qualify at least one of a simultaneous beam forming characteristic, a beam crosstalk characteristic, and a beam co-existence characteristic a of the device under test based on the received RF signals.

In embodiments, a dedicated measurement application antenna may be provided for more than one of the reflection zones. For example, one measurement application antenna may be provided per reflection zone.

Each one of the measurement application antennas may be coupled to a dedicated port of the measurement application device or to a dedicated measurement application device. With multiple measurement application antennas in a test system, multiple RF signals may be received at the same time.

Modern communication systems comprise communication devices that may generate multiple beams based on different RF signals at the same time. With such communication devices, it is essential that each beam is generated accurately with the required parameters.

With the test system comprising multiple reflection zones on the RIS reflector and dedicated antennas for at least some of the reflection zones, it is possible to measure multiple RF signals at the same time that may be provided in different beams by the device under test.

Such an arrangement, therefore, allows easily qualify a simultaneous beam forming characteristic of the device under test. The measurement application device may, for example, determine the beamforming characteristics for all beams that are concurrently emitted by the device under test. In such embodiments, progressive tests may be performed. To this end, the device under test may be controlled to gradually increase the number of concurrently emitted beams, while the measurement application device verifies that the beamforming characteristics are appropriate with each increase of the number of concurrently emitted beams.

Other details of the device under test that may be characterized based on the received RF signals with two or more concurrently emitted and measured beams comprise, but are not limited to a beam crosstalk characteristic, and a beam co-existence characteristic a of the device under test.

In another embodiment, which can be combined with all other embodiments of the test system mentioned above or below, the measurement application device may be configured to transmit the RF signals to the device under test via the RIS reflector.

As for the single reflection zone tests described above, with multiple reflection zones the RF signal may also be transmitted to the device under test via the RIS reflector. In embodiments, multiple RF signals may be transmitted to the device under test, each via a dedicated measurement application antenna of the test system.

In an embodiment, which can be combined with all other embodiments of the test system mentioned above or below, the test system may further comprise a reflector controller configured to control reflection characteristics of the RIS reflector, wherein the reflector controller may be configured to control the RIS reflector to reflect the incoming signal as reflected signal towards one measurement application antenna for each one of a plurality of different predefined positions of the DUT relative to the RIS reflector.

The reflector controller may in embodiments be provided as a dedicated controller or control unit. The explanations provided above, regarding the test controller apply mutatis mutandis to the reflector controller. It is understood, that the reflector controller may be provided in any of the embodiments of the test system to control the RIS reflector accordingly.

The reflector controller may be provided as at least one of a dedicated processing element e.g., a processing unit, a microcontroller, a field programmable gate array, FPGA, a complex programmable logic device, CPLD, an application specific integrated circuit, ASIC, or the like. The reflector controller may at least in part also be provided as a computer program product comprising computer readable instructions that may be executed by a processing element. In a further embodiment, the reflector controller may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

In embodiments, the reflector controller may be integrated into or be provided as part of the test controller.

The reflector controller controls the RIS reflector as required for a respective test. The reflector controller may for example control the RIS reflector to reflect an incoming signal over the full area of the RIS reflector with the same directivity.

In embodiments, the reflector controller may control the RIS reflector to provide a respective reflectivity or directivity to one or multiple antennas in a respective reflection zone, or multiple reflection zones.

In a specific embodiment, the reflector controller may repeatedly control the RIS reflector to exhibit different directivity or reflection characteristics that depend on a current position of the device under test.

The above-mentioned fixation mechanism may, for example, be used to move the device under test with respect to the RIS reflector to different positions to provide e.g., different incident or impinging angles for the RF signal onto the RIS reflector. The reflector controller may then control the RIS reflector accordingly to reflect the RF signal to the respective measurement application antenna.

In embodiments, the multiple reflection zones may be combined with a moving device under test. Such an arrangement allows fully qualifying a device under test with a RIS reflector of limited size. For example, the device under test may be positioned at a respective position relative to the RIS reflector that allows qualifying only part of the steering range of the device under test. After qualifying this part of the steering range, the device under test may be moved to another position that allows qualifying a further part of the steering range, and so on. For every position of the device under test, the RIS reflector may be configured accordingly.

In a further embodiment, which can be combined with all other embodiments of the test system mentioned above or below, the measurement application device may be configured to receive the RF signals from the device under test via the RIS reflector and the respective measurement application antenna with the device under test being provided in the different predefined positions relative to the RIS reflector, and to qualify a beam sweeping characteristic of the device under test based on the received RF signals.

As indicated above, the device under test may be moved to different positions with respect to the RIS reflector to perform multiple measurements. Of course, the measurement application device may be configured to measure the RF signal repeatedly for all possible positions of the measurement application device, and may qualify the beamforming characteristics for all these positions.

With multiple measurements taken, the measurement application device may also determine or qualify beam sweeping characteristic of the device under test based on the received RF signals.

In another embodiment, which can be combined with all other embodiments of the test system mentioned above or below, the measurement application device may be configured to transmit the RF signals to the device under test via the RIS reflector and the respective measurement application antenna with the device under test being provided in the different predefined positions relative to the RIS reflector.

As for the single reflection zone tests described above, with multiple positions of the device under test, the RF signal may also be transmitted to the device under test via the RIS reflector. In embodiments, multiple RF signals may be transmitted to the device under test, each via a dedicated measurement application antenna of the test system.

In a further embodiment, which can be combined with all other embodiments of the test system mentioned above or below, the RIS reflector may comprise at least one antenna reflection zone and at least one scattering zone, wherein each one of the antenna reflection zones may be configured to reflect the incoming signal as reflected signal towards one measurement application antenna when the incoming signal impinges onto the respective antenna reflection zone with a predetermined zone-specific angle, and wherein each one of the scattering zones may be configured not to reflect the incoming signal as reflected signal towards the respective measurement application antenna when the incoming signal impinges onto the respective antenna reflection zone with a predetermined zone-specific angle.

The test system with the at least one antenna reflection zone and the at least one scattering zone may be used to perform tests of the shape, footprint or pattern of the beamforming performed by the device under test.

To this end, the antenna reflection zones may be configured to reflect an incoming signal to a respective measurement application antenna if the incoming signal originates at a predefined position. At the same time, the scattering zones may be configured to reflect the incoming signal away from a respective measurement application antenna if the incoming signal originates at the predefined position.

With multiple antenna reflection zones, each one of the antenna reflection zones may be configured with a different reflectivity. For example, all antenna reflection zones may be configured to reflect an incoming or impinging signal that originates at the same position for all antenna reflection zones to the same measurement application antenna.

In another embodiment, which can be combined with all other embodiments of the test system mentioned above or below, the measurement application device may be configured to receive the RF signals from the device under test via the RIS reflector and the respective measurement application antenna, and to qualify a beam pattern characteristic of the device under test based on the received RF signals.

A beam with a shape that matches the shape of the respective antenna reflection zone will be maximally reflected towards the measurement application antenna. The measurement application device will, therefore, measure the RF signal indicating a high quality of the beamforming characteristics of the device under test.

A beam with a shape that does not match the shape of the respective antenna reflection zone and at least partially covers the scattering zone will, therefore, not be fully reflected towards the respective antenna reflection zone. The measurement application device will, consequently, only receive part of the RF signal emitted by the device under test, which may result in a negative qualification result for the device under test.

In a further embodiment, which can be combined with all other embodiments of the test system mentioned above or below, the measurement application device may be configured to transmit the RF signals to the device under test via the RIS reflector and the respective measurement application antenna.

As for the single reflection zone tests described above, with antenna reflection zones and scattering zones, the RF signal may also be transmitted to the device under test via the RIS reflector. In embodiments, multiple RF signals may be transmitted to the device under test, each via a dedicated measurement application antenna of the test system.

In an embodiment, which can be combined with all other embodiments of the test system mentioned above or below, the at least one antenna reflection zone may comprise at least one of a circular shape, an elliptical shape, a rectangular shape or a square shape.

As indicated above, the antenna reflection zones may each comprise a specific shape. These shapes may comprise circular shapes, and especially may comprise shapes that may be formed by a circular beam when hitting a target from a non-orthogonal direction, like elliptical shapes. Any arbitrary shape is however, also possible.

In a further embodiment, which can be combined with all other embodiments of the test system mentioned above or below, the measurement application device may be configured to qualify the beamforming characteristics of the device under test as erroneous, if at least one of an equivalent isotropically radiated power, EIRP, of the RF signal is below a predetermined threshold value, and an error vector magnitude, EVM, is above a predetermined threshold value.

In order to qualify any of the beamforming characteristics, the measurement application device may determine the EIRP and/or the EVM and compare these values to respective threshold values.

Determining if the EIRP is above, or the EVM is below a predetermined threshold value provides an easy way of determining if the beamforming characteristics of the device under test are as expected or not.

In embodiments, one or multiple test system according to the present disclosure may be used to perform measurements with a device under test under normal operating conditions.

For example, a satellite may be tested by providing one or more RIS reflectors with respective measurement application antennas and measurement application devices at different locations on the surface of the earth.

Each one of the measurement application device may then perform measurement for the respective device under test. Some of the arrangements may be provided within an intended area that should be illuminated by a beam from the device under test, while others of these arrangements may be provided outside of this area. The measurements then allow, for example, determining if the shape of the beam is as expected.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
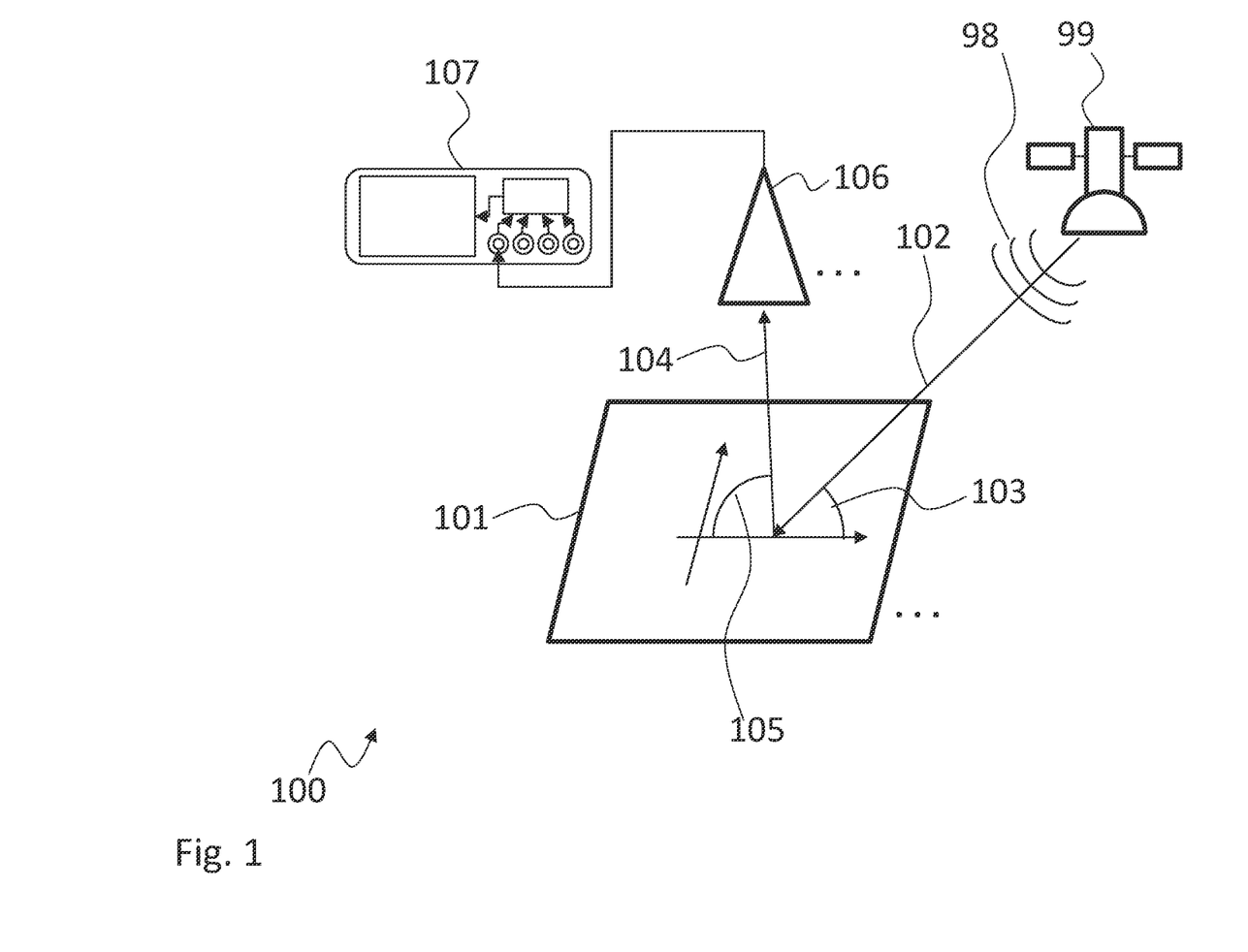
FIG. 1 shows a block diagram of an embodiment of a test system according to the present disclosure.

FIG. 1 shows a block diagram of a test system 100. The test system 100 exemplarily comprises a Reconfigurable Intelligent Surface, RIS, reflector 101, wherein further RIS reflectors are hinted at by three dots. In addition, the test system 100 exemplarily comprises a measurement application antenna 106, wherein further possible measurement application antennas are hinted at by three dots. The measurement application antenna 106 may in embodiments be provided as a horn antenna or any other type of antenna with a high directivity. Further, a measurement application device 107 is coupled to the measurement application antenna 106.

The RIS reflector 101 reflects an incoming signal 102 that impinges on the RIS reflector 101 with a predefined impinging angle 103 as reflected signal 104 with a predefined outgoing angle 105 towards the measurement application antenna 106. This implies, that an RF signal 98 sent e.g., by the device under test 99 from a predefined position, such that the RF signal 98 impinges on the RIS reflector 101 with the impinging angle 103, will be reflected towards the measurement application antenna 106.

The measurement application device 107 may receive the RF signal 98 via the RIS reflector 101 and the measurement application antenna 106, or may transmit respective signals to the device under test 99 via the measurement application antenna 106 and the RIS reflector 101. The measurement application device 107 may then qualify beamforming characteristics of the device under test 99 based on RF signals exchanged between the measurement application device 107 and the device under test 99.

The measurement application device 107 may e.g., qualify the beamforming characteristics of the device under test 99 as erroneous, if at least one of an equivalent isotropically radiated power, EIRP, of the RF signal 102 is below a predetermined threshold value, and an error vector magnitude, EVM, is above a predetermined threshold value. This may apply for an RF signal 98 received at the measurement application device 107, or for an RF signal 98 sent to the device under test 99 and evaluated after reception by the device under test 99.

In embodiments, the RIS reflector 101 may be implemented as RIS reflector 101 with static reflection, directivity or beamforming characteristics. In other embodiments, the RIS reflector 101 may be a configurable RIS reflector 101. As will be seen below, a respective reflector controller may be provided to control the reflection, directivity or beamforming characteristics of the RIS reflector 101. Such a controller may in embodiments be implemented in the measurement application device 107 or as a dedicated device.

Although only schematically shown, it is understood, that the measurement application device 107 may comprise any adequate measurement or signal generation device, for example, but not limited to, a spectrum analyzer, a (vector) network analyzer, an arbitrary signal generator or a vector signal generator.

With the arrangement of the test system 100, the beamforming characteristics of the device under test 99 may easily be qualified for different beamforming angles, for example by step-wise rotating the device under test 99 such that the device under test 99 is required to adapt the angle for emitting the RF signal 98 in the correct direction towards the RIS reflector 101, and performing a measurement with the measurement application device 107 for every rotation step.

Figure 2:
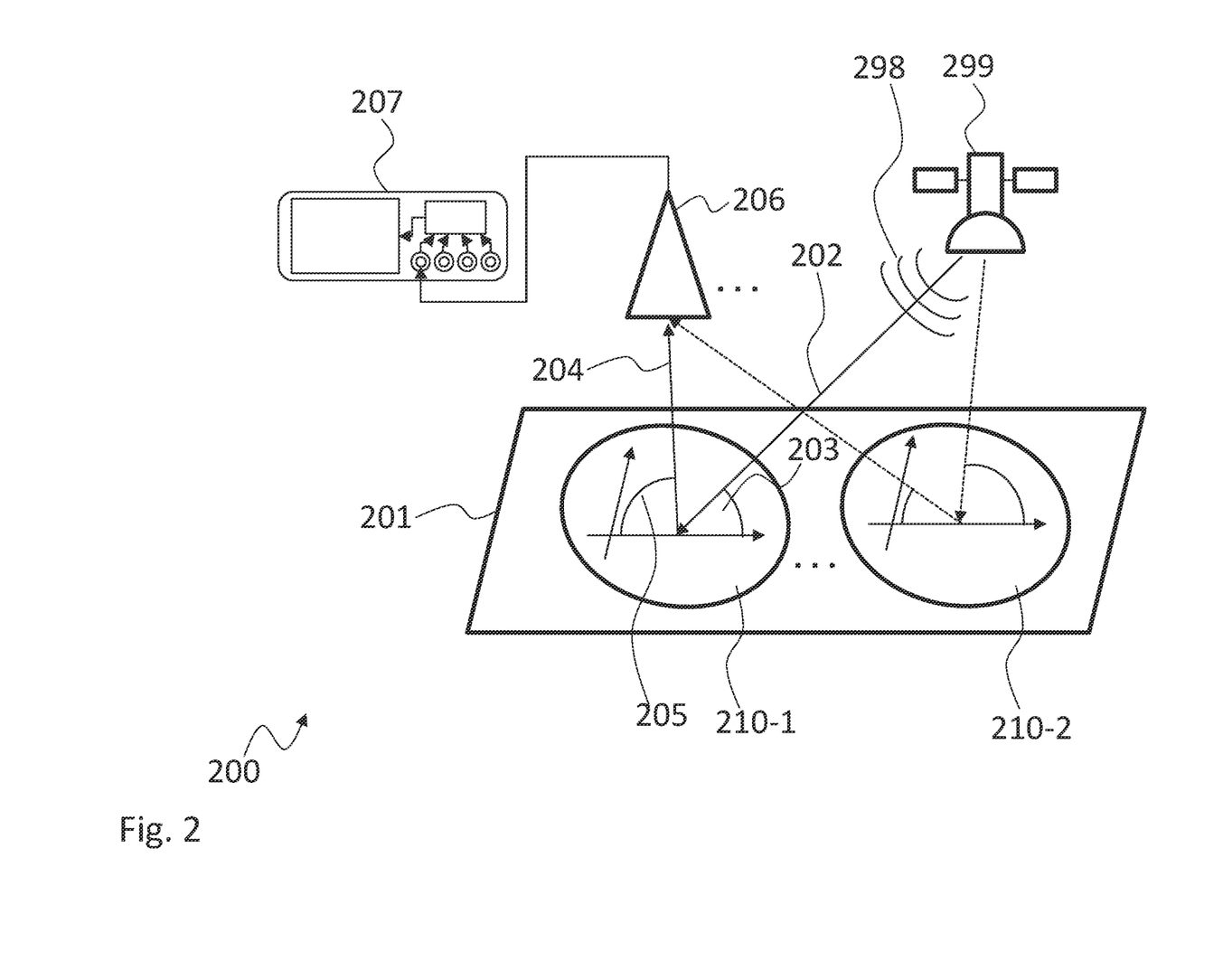
FIG. 2 shows a block diagram of another embodiment of a test system according to the present disclosure.

FIG. 2 shows a block diagram of another test system 200. The test system 200 is based on the test system 100. Therefore, the test system 200 comprises a RIS reflector 201 with a measurement application antenna 206 that is coupled to a measurement application device 207. The explanations provided above regarding the test system 100 apply mutatis mutandis.

The RIS reflector 201 exemplarily comprises two reflection zones 210-1, 210-2, wherein more reflection zones are hinted at by three dots. For sake of simplicity, only the features of the reflection zone 210-1 are provided with reference signs. It is understood, that the respective explanations apply to both reflection zones 210-1, 210-2 accordingly.

The reflection zones 210-1, 210-2 each are configured to reflect an incoming signal 202 that impinges on any of the reflection zones 210-1, 210-2 from a predetermined originating position towards the measurement application antenna 206, here the position of the device under test 299 that emits the RF signal 298.

With the arrangement of the test system 200, it is possible to test the device under test 299 with different beam directions without moving or rotating the device under test 299.

The device under test 299 may e.g., be controlled to consecutively direct a beam with the RF signal 298 to each one of the reflection zones 210-1, 210-2 from the same position. The measurement application device 207 may then perform a respective measurement and qualify the beamforming characteristics of the device under test 299 for each one of the reflection zones 210-1, 210-2.

As indicated above, the RIS reflector 201 may be statically configured to exhibit the different reflection zones 210-1, 210-2 with different directivity characteristics.

In embodiments, the RIS reflector 201 may be dynamically controlled to exhibit different directivity characteristics over time. With such a RIS reflector 201, the reflection zones 210-1, 210-2 may be dynamically generated by step-wise or continuously moving a single zone over the surface of the RIS reflector 201, while the beam generated by the device under test 299 moves over the surface of the RIS reflector 201. This allows continuously monitoring the beam steering as performed by the device under test 299.

In embodiments, the measurement application device 207 may also send a test signal to the device under test 299 via the different reflection zones 210-1, 210-2.

Figure 3:
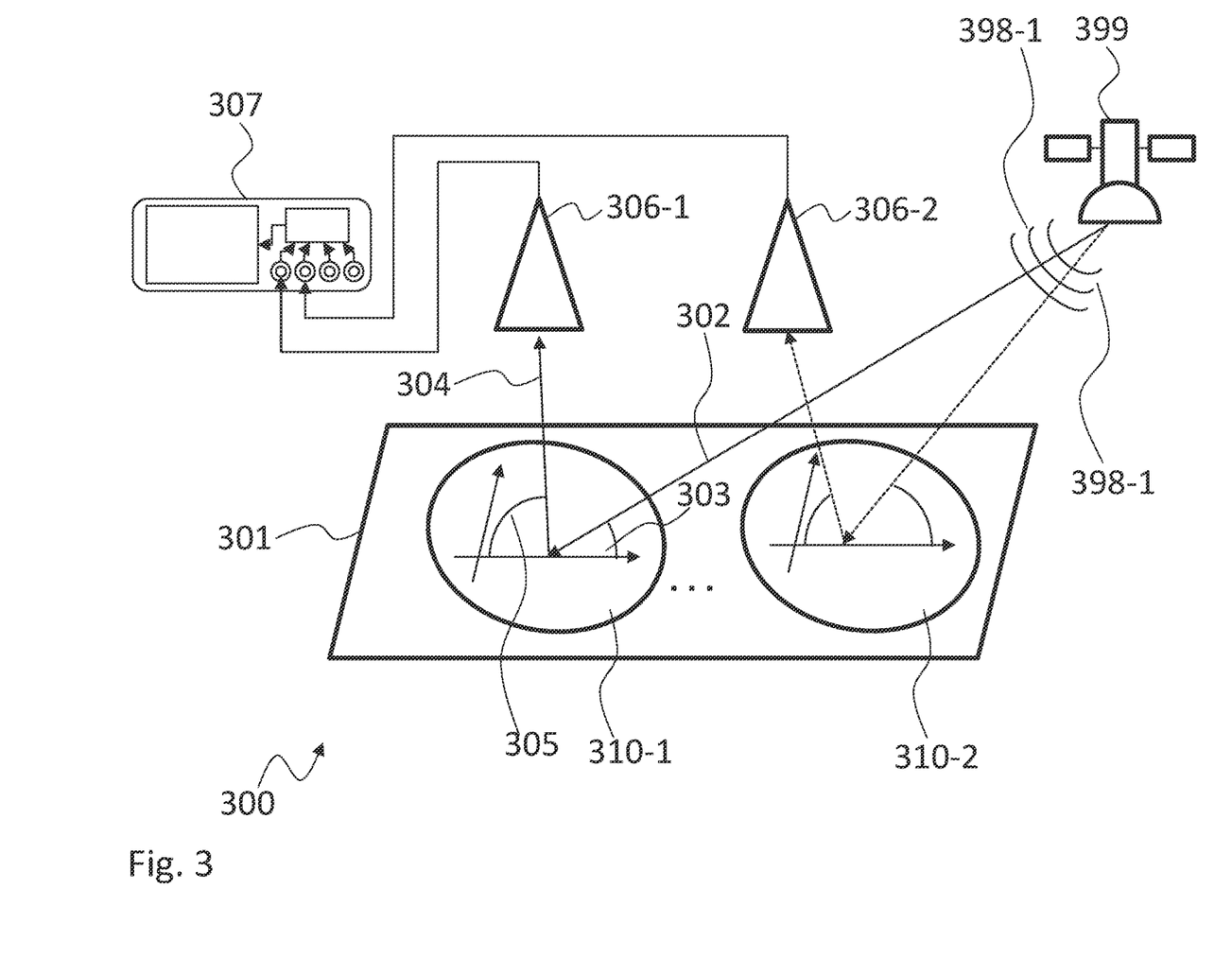
FIG. 3 shows a block diagram of a further embodiment of a test system according to the present disclosure.

FIG. 3 shows a block diagram of a test system 300. The test system 300 is based on the test system 200. Therefore, the test system 300 comprises a RIS reflector 301 with two exemplary reflection zones 310-1, 310-2, wherein more reflection zones are hinted at by three dots. The test system 300 further comprises a measurement application antenna 306-1 that is coupled to a measurement application device 307. The explanations provided above regarding the test system 200 apply mutatis mutandis.

The test system 300 comprises an additional measurement application antenna 306-2 that is coupled to the measurement application device 307. It is understood, that more additional measurement application antennas are possible, as hinted at by three dots.

With this additional measurement application antenna 306-2, the measurement application device 307 may receive multiple RF signals 398-1, 398-2 at the same time. This allows testing modern devices under test 399 that are capable of generating multiple beams at the same time.

With such devices under test 399 it is important to test or qualify the beamforming characteristics for the multi-beam generation situation. If such a device under test 399 does not generate the single beams correctly, for example, beam crosstalk or beam co-existence is possible.

The measurement application device 307 may, therefore, acquire two RF signals 398-1, 398-2 emitted by the device under test 399 at the same time, and verify the beamforming characteristics of the device under test 399 by verifying that beam crosstalk or beam co-existence are not or only present within an acceptable level.

Figure 4:
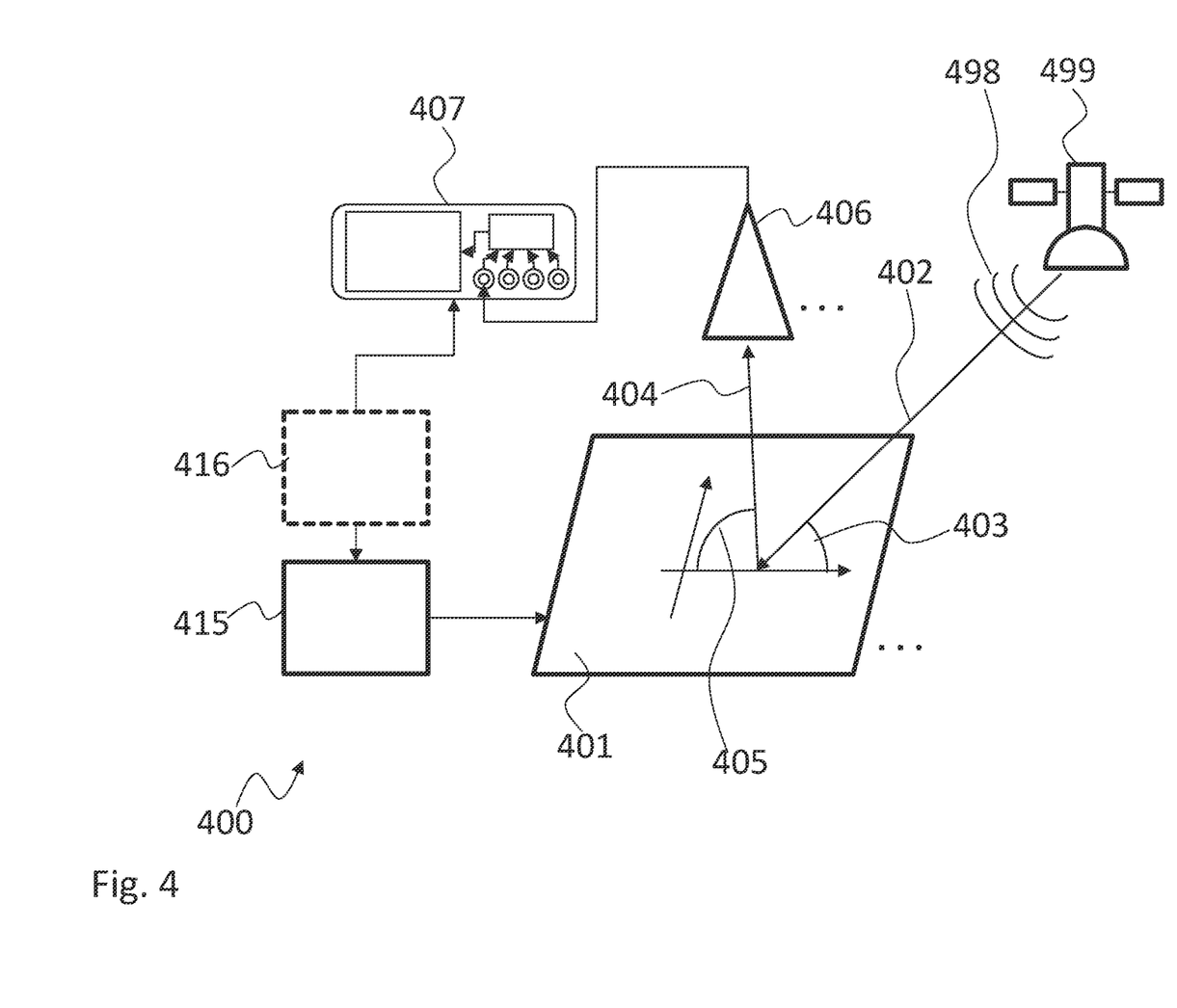
FIG. 4 shows a block diagram of yet another embodiment of a test system according to the present disclosure.

FIG. 4 shows a block diagram of a test system 400. The test system 400 is based on the test system 100. Therefore, the test system 400 comprises a RIS reflector 401 with a measurement application antenna 406 that is coupled to a measurement application device 407. The explanations provided above regarding the test system 100 apply mutatis mutandis.

The test system 400 further comprises a reflector controller 415 that is coupled to the RIS reflector 401. Further, an optional test controller 416 is shown that is coupled to the reflector controller 415 and the measurement application device 407. It is understood, that the reflector controller 415 and the optional test controller 416 may be provided in any of the embodiments of the test system provided in this disclosure.

The reflector controller 415 may dynamically control the RIS reflector 401 to reflect an incoming signal 402 from any adequate direction towards the measurement application antenna 406. The reflector controller 415, therefore, allows easily adapting the RIS reflector 401, and the test system 400, to different types of devices under test 499. It is understood, that the reflector controller 415 may comprise any adequate driving units to drive the single meta atoms of the RIS reflector 401 accordingly. Such driving units may be coupled to any other element of the reflector controller 415 that is disclosed for the reflector controller 415 in the explanations presented in this disclosure e.g., to a controller or control unit.

The test controller 416 may be provided to perform a general test management or test controlling. Although not shown, the test controller 416 may also be communicatively coupled to the devices under test 499, and a respective fixation or positioning mechanism for the devices under test 499, if present. More detailed explanations of the test controller 416 are provided above.

Figure 5:
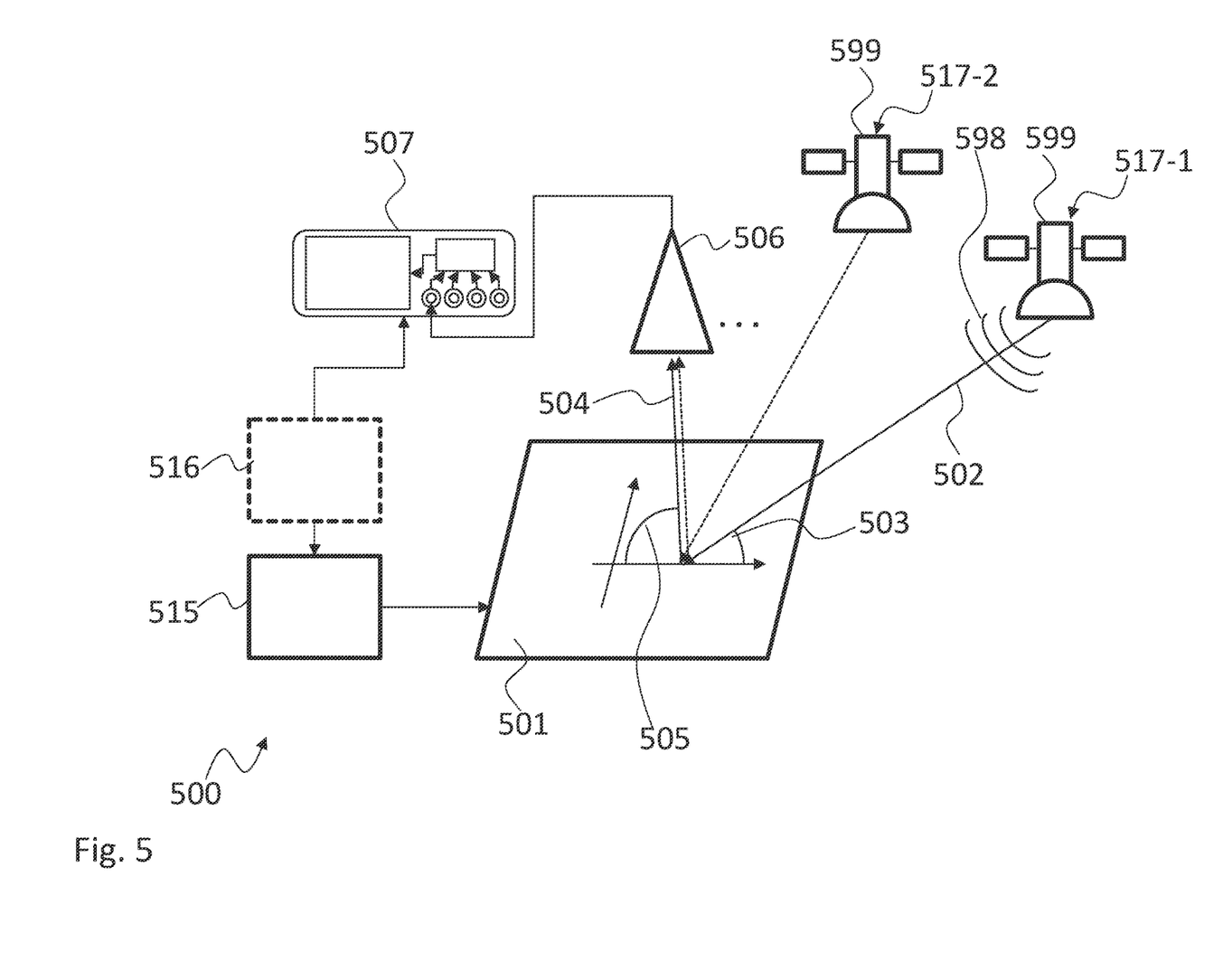
FIG. 5 shows a block diagram of a further embodiment of a test system according to the present disclosure.

FIG. 5 shows a block diagram of a test system 500. The test system 500 is based on the test system 400. Therefore, the test system 500 comprises a RIS reflector 501 with a measurement application antenna 506 that is coupled to a measurement application device 507. A reflector controller 515 is coupled to the RIS reflector 501, and an optional test controller 516 is shown that is coupled to the reflector controller 515 and the measurement application device 507. The explanations provided above regarding the test system 400 apply mutatis mutandis.

FIG. 5 shows an embodiment of the test system 500 that allows testing the device under test 599 while multiple beams are generated by the device under test 599 in different directions.

To this end, the device under test 599 may be brought into different predefined positions 517-1, 517-2 or may be continuously moved with respect to the RIS reflector 501 and the measurement application antenna 506.

The reflector controller 515 may control the RIS reflector 501 for every position 517-1, 517-2 of the device under test 599, to reflect an RF signal 598 originating at the respective position 517-1, 517-2 to the measurement application device 507. The directivity of the RIS reflector 501 may be controlled step-wise or continuously, depending on the movement of the device under test 599. It is understood, that although only two positions 517-1, 517-2 are shown for the device under test 599, any number of positions or a continuous movement of the device under test 599 is possible.

As indicated above, the test controller 516 may be provided to control the position of the device under test 599 e.g., via a respective fixation or movement arrangement. At the same time, the test controller 516 may control the measurement application device 507, and the RIS reflector 501 via the reflector controller 515.

Figure 6:
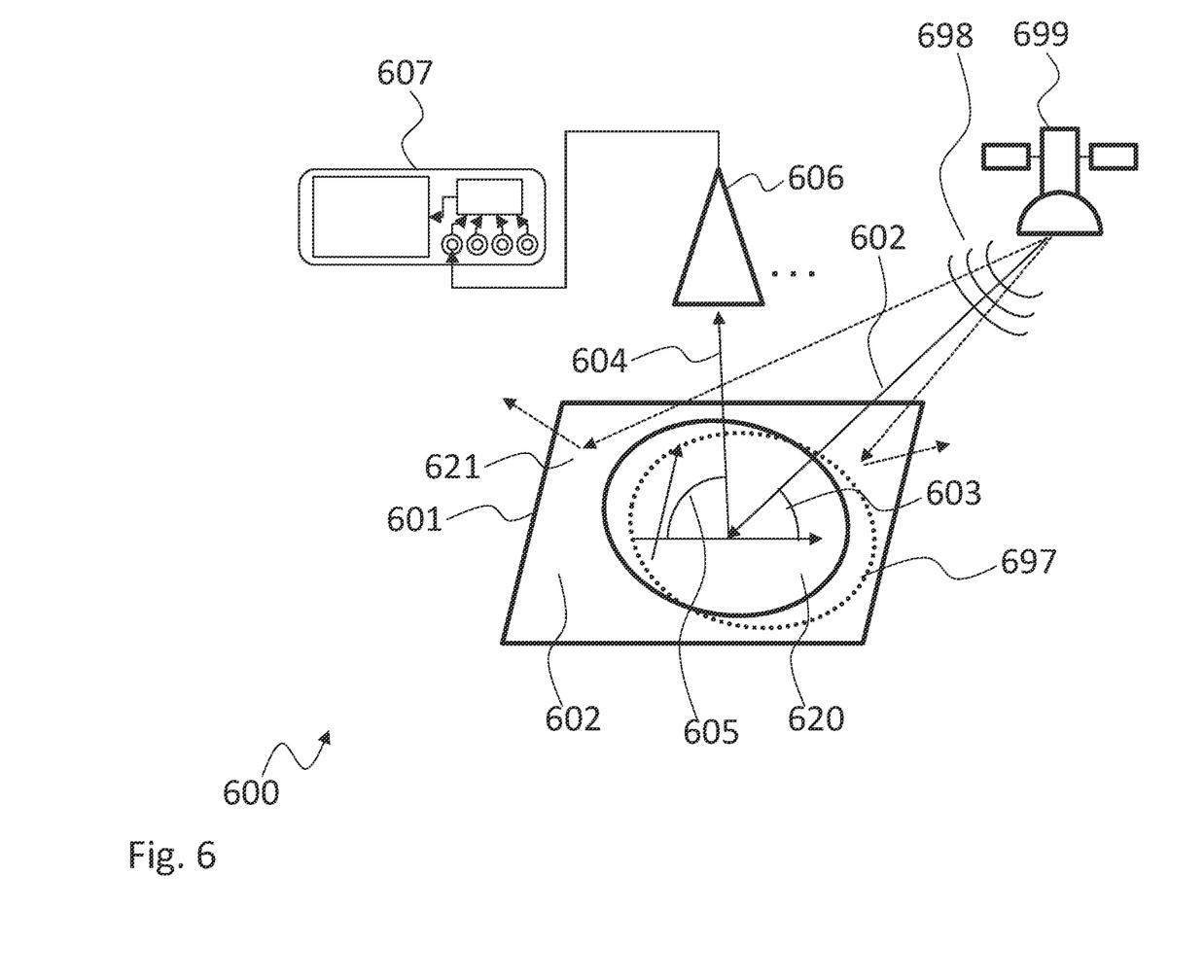
FIG. 6 shows a block diagram of another embodiment of a test system according to the present disclosure.

FIG. 6 shows a block diagram of a test system 600. The test system 600 is based on the test system 100. Therefore, the test system 600 comprises a RIS reflector 601 with a measurement application antenna 606 that is coupled to a measurement application device 607. The explanations provided above regarding the test system 100 apply mutatis mutandis.

The RIS reflector 601 comprises two different zones, an antenna reflection zone 620, and a scattering zone 621. It is understood, that although only one antenna reflection zone 620, and one scattering zone 621 are shown, any number of antenna reflection zones and scattering zones is possible.

The antenna reflection zone 620 reflects the incoming signal 602 as reflected signal 604 towards the measurement application antenna 606 i.e., with an outgoing angle 604, when the incoming signal 602 impinges onto the antenna reflection zone 620 with a predetermined zone-specific angle 603. The zone-specific angle 603 may be defined for a specific predetermined position of the device under test 699 as originating position for the incoming signal 602.

In contrast to the antenna reflection zone 620, the scattering zone 621 does not reflect the incoming signal 602 as reflected signal 604 towards the measurement application antenna 606, when the incoming signal 602 impinges onto the antenna reflection zone 620 with a predetermined zone-specific angle. The zone-specific angle of the scattering zone 621 may be chosen to be the angle with which an RF signal 698 impinges on the scattering zone 621 if emitted from the originating position as defined for the antenna reflection zone 620.

The scattering zone 621 in embodiments may surround the antenna reflection zone 620. If multiple antenna reflection zones are provided, a single one or multiple scattering zones may surround these antenna reflection zones.

The antenna reflection zone 620, consequently, defines the target zone for the RF signal 698 or the beam generated by the device under test 699. The scattering zone 621 in contrast defines a zone that should not be illuminated by the RF signal 698 or the beam generated by the device under test 699.

The shape of the antenna reflection zone 620 may be configured as desired or may be dynamically controlled as required for a respective test application. An RF signal 698 or beam impinging exactly on the antenna reflection zone 620 will, therefore, lead to a higher signal level at the measurement application device 607, as an RF signal or beam 397 that does not hit the antenna reflection zone 620 exactly.

With the test system 600 it is, therefore, possible to easily qualify the beam shape or beam pattern forming characteristics of the device under test 699 by measuring the signal level at the measurement application device 607 with the RIS reflector 601 configured to have an antenna reflection zone 620 with the respective shape or pattern.

Of course, such a test may be performed dynamically by dynamically controlling the device under test 699 to modify the shape of pattern of the generated beam and modifying the configuration of the antenna reflection zone 620 accordingly.

Figure 7:
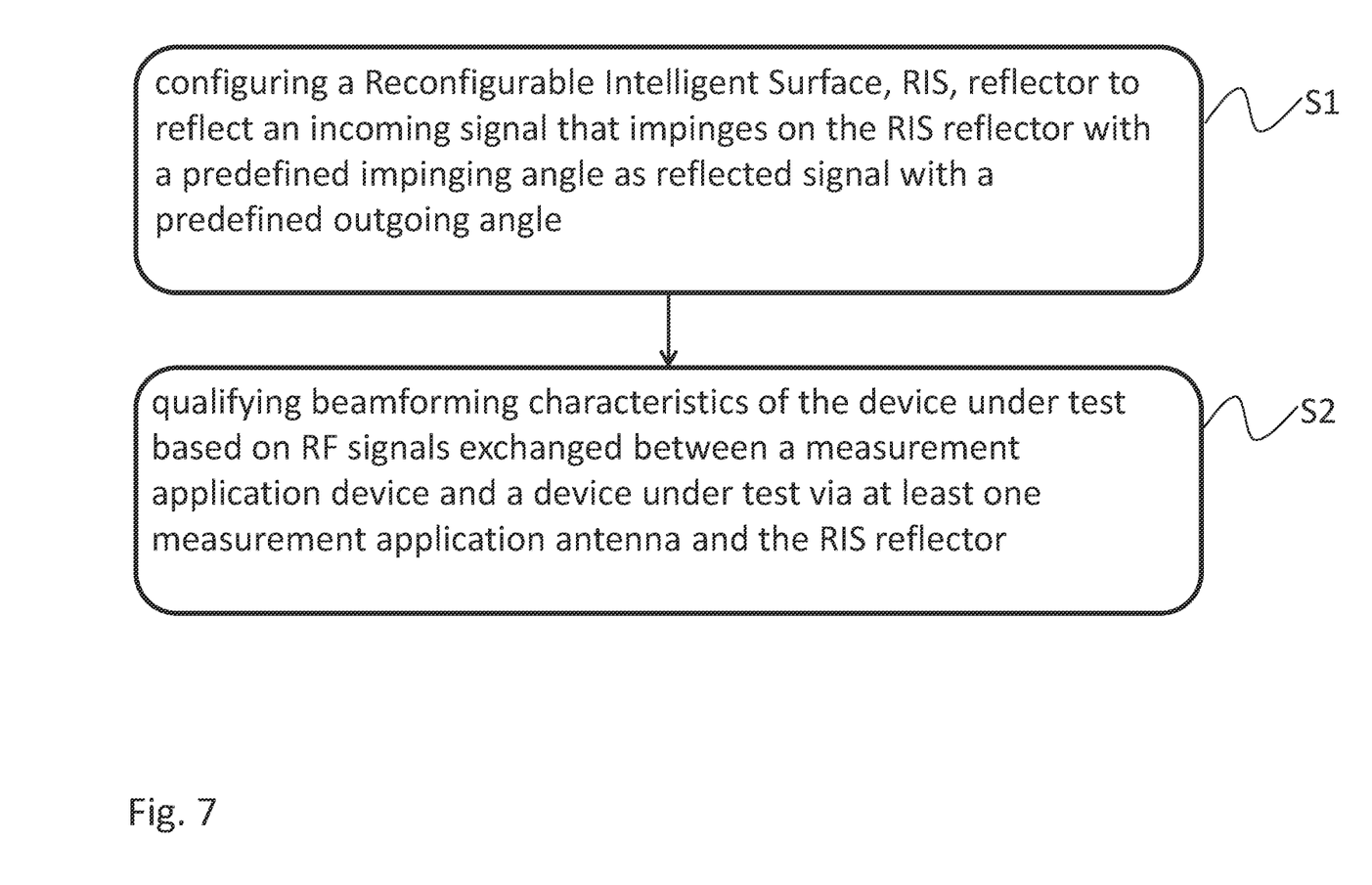
FIG. 7 shows a flow diagram of an embodiment of a test method according to the present disclosure.

FIG. 7 shows a flow diagram of a test method for testing, especially, the beamforming characteristics of a device under test.

The test method comprises configuring S1 a Reconfigurable Intelligent Surface, RIS, reflector to reflect an incoming signal that impinges on the RIS reflector with a predefined impinging angle as reflected signal with a predefined outgoing angle, and qualifying S2 beamforming characteristics of the device under test based on RF signals exchanged between a measurement application device and a device under test via at least one measurement application antenna and the RIS reflector.

The beamforming characteristics of the device under test may, for example, be qualified as erroneous, if at least one of an equivalent isotropically radiated power, EIRP, of the RF signal is below a predetermined threshold value, and an error vector magnitude, EVM, is above a predetermined threshold value.

The RIS reflector may, for example be configured to reflect the incoming signal as reflected signal towards a single measurement application antenna when the incoming signal impinges onto the RIS reflector with a predetermined first angle. In such an embodiment, the method may further comprise at least one of receiving the RF signals from the device under test via the RIS reflector and the respective measurement application antenna at the measurement application device, and qualifying a beam directivity characteristic of the device under test based on the received RF signals in the measurement application device; or transmitting the RF signals to the device under test via the RIS reflector and the respective measurement application antenna from the measurement application device.

In embodiments, the RIS reflector may be configured to comprises at least two reflection zones. Each one of the reflection zones may be configured to reflect the incoming signal as reflected signal towards one measurement application antenna when the incoming signal impinges onto the respective reflection zone with a predetermined zone-specific angle.

The at least two reflecting zones may each be configured to reflect the incoming signal to the same measurement application antenna. The RF signals from the device under test may then be received via the RIS reflector and the respective measurement application antenna at the measurement application device, and a beam sweeping characteristic of the device under test may be qualified based on the received RF signals.

Alternatively, the at least two reflecting zones may each be configured to reflect the incoming signal to a different measurement application antenna. The RF signals are then received from the device under test via the RIS reflector and the respective measurement application antennas at the measurement application device, and at least one of a simultaneous beam forming characteristic, a beam crosstalk characteristic, and a beam co-existence characteristic of the device under test may be qualified based on the received RF signals.

In embodiments, the RIS reflector may be controlled to reflect the incoming signal as reflected signal towards one measurement application antenna for each one of a plurality of different predefined positions of the DUT relative to the RIS reflector. In such embodiments, the method may further comprise at least one of receiving the RF signals from the device under test via the RIS reflector and the respective measurement application antenna at the measurement application device with the device under test being provided in the different predefined positions relative to the RIS reflector, and qualifying a beam sweeping characteristic of the device under test based on the received RF signals; or transmitting the RF signals to the device under test via the RIS reflector and the respective measurement application antenna with the device under test being provided in the different predefined positions relative to the RIS reflector.

In embodiments, the RIS reflector may be configured to comprise at least one antenna reflection zone and at least one scattering zone. In such embodiments, each one of the antenna reflection zones may be configured to reflect the incoming signal as reflected signal towards one measurement application antenna when the incoming signal impinges onto the respective antenna reflection zone with a predetermined zone-specific angle. Further, each one of the scattering zones may be configured not to reflect the incoming signal as reflected signal towards the respective measurement application antenna when the incoming signal impinges onto the respective antenna reflection zone with a predetermined zone-specific angle. With such a configuration the method may further comprise at least one of receiving the RF signals from the device under test via the RIS reflector and the respective measurement application antenna at the measurement application device, and qualifying a beam pattern characteristic of the device under test based on the received RF signals; or transmitting the RF signals to the device under test via the RIS reflector and the respective measurement application antenna.

The at least one antenna reflection zone may for example be configured to comprise at least one of a circular shape, an elliptical shape, a rectangular shape or a square shape.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

| LIST OF REFERENCE SIGNS | |
|---|---|
| 100, 200, 300, 400, 500, 600 | test system |
| 101, 201, 301, 401, 501, 601 | RIS reflector |
| 102, 202, 302, 402, 502, 602 | incoming signal |
| 103, 203, 303, 403, 503, 603 | impinging angle |
| 104, 204, 304, 404, 504, 604 | reflected signal |
| 105, 205, 305, 405, 505, 605 | outgoing angle |
| 106, 206, 306-1, 306-2, 406, 506, 606 | measurement application antenna |
| 107, 207, 307, 407, 507, 607 | measurement application device |
| 210-1, 210-2, 310-1, 310-2 | reflection zones |
| 415, 515 | reflector controller |
| 416, 516 | test controller |
| 517-1, 517-2 | position |
| 620 | antenna reflection zone |
| 621 | scattering zone |
| 99, 299, 399, 499, 599, 699 | device under test |

LIST OF REFERENCE SIGNS

| | |
|---|---|
| 98, 298, 398-1, 398-2, 498, 598, 698 | RF signals |
| 697 | beam |

What is claimed is:

1. A test system for testing a satellite, the test system comprising:
    at least one highly directive measurement application antenna; and
    a Reconfigurable Intelligent Surface (RIS) reflector configured to reflect an incoming signal from the satellite that impinges on the RIS reflector with a predefined impinging angle as a reflected signal with a predefined outgoing angle;
    a measurement application antenna, wherein the RIS reflector is configured to reflect the incoming signal as the reflected signal towards the measurement application antenna when the incoming signal impinges onto the RIS reflector with a predetermined first angle; and
    a measurement application device coupled to the highly directive measurement application antenna and configured to qualify beamforming characteristics of the satellite for each one of a plurality of positions via the measurement application antenna and the RIS reflector, wherein the satellite emits a RF signal with a respective beamforming applied in each one of the plurality of positions.

2. The test system according to claim 1, wherein the measurement application device is configured to qualify a beam directivity characteristic of the satellite based on the RF signals.

3. The test system according to claim 1, wherein the measurement application device is configured to transmit the RF signals to the satellite via the RIS reflector and the respective measurement application antenna.

4. The test system according to claim 1, wherein the RIS reflector comprises at least two reflection zones, wherein each one of the reflection zones is configured to reflect the incoming signal as a reflected signal towards a measurement application antenna when the incoming signal impinges onto the respective reflection zone with a predetermined zone-specific angle.

5. The test system according to claim 4, wherein the at least two reflecting zones are each configured to reflect the incoming signal to the same measurement application antenna, and
    wherein the measurement application device is configured to qualify a beam sweeping characteristic of the satellite based on the RF signals.

6. The test system according to claim 4, further comprising:
    at least two measurement application antennas,
    wherein the at least two reflecting zones are each configured to reflect the incoming signal to a different one of the at least two measurement application antennas, and
    wherein the measurement application device is configured to receive the RF signals from the satellite via the RIS reflector and the at least two measurement application antennas, and to qualify at least one of a simultaneous beam forming characteristic, a beam crosstalk characteristic, and a beam co-existence characteristic of the satellite based on the RF signals.

7. The test system according to claim 4, wherein the measurement application device is configured to transmit the RF signals to the satellite via the RIS reflector.

8. The test system according to claim 1, further comprising:
    a reflector controller configured to control reflection characteristics of the RIS reflector,
    wherein the reflector controller is configured to control the RIS reflector to reflect the incoming signal as a reflected signal towards a measurement application antenna for each one of the plurality of positions of the satellite relative to the RIS reflector.

9. The test system according to claim 8, wherein the measurement application device is configured to receive the RF signals from the satellite via the RIS reflector and the respective measurement application antenna with the satellite being provided in the plurality of positions relative to the RIS reflector, and to qualify a beam sweeping characteristic of the satellite based on the RF signals.

10. The test system according to claim 8, wherein the measurement application device is configured to transmit the RF signals to the satellite via the RIS reflector and the measurement application antenna with the satellite being provided in the plurality of positions relative to the RIS reflector.

11. The test system according to claim 1, wherein the RIS reflector comprises at least one antenna reflection zone and at least one scattering zone,
    wherein each one of the antenna reflection zones is configured to reflect the incoming signal as reflected signal towards a respective measurement application antenna when the incoming signal impinges onto the respective antenna reflection zone with a predetermined zone-specific angle, and
    wherein each one of the at least one scattering zones is configured not to reflect the incoming signal as reflected signal towards the respective measurement application antenna when the incoming signal impinges onto the respective antenna reflection zone with a predetermined zone-specific angle.

12. The test system according to claim 11, wherein the measurement application device is configured to receive the RF signals from the satellite via the RIS reflector and the respective measurement application antenna, and to qualify a beam pattern characteristic of the satellite based on the RF signals.

13. The test system according to claim 11, wherein the measurement application device is configured to transmit the RF signals to the satellite via the RIS reflector and the respective measurement application antenna.

14. The test system according to claim 11, wherein the at least one antenna reflection zone comprises at least one of a circular shape, an elliptical shape, a rectangular shape, or a square shape.

15. The test system according to claim 1, wherein the measurement application device is configured to qualify the beamforming characteristics of the satellite as erroneous, if at least one of an equivalent isotropically radiated power (EIRP) of the RF signals is below a predetermined threshold value, and an error vector magnitude (EVM) is above a predetermined threshold value.

16. A test method for testing a satellite, the test method comprising:
    configuring a Reconfigurable Intelligent Surface (RIS) reflector to reflect an incoming signal from the satellite that impinges on the RIS reflector with a predefined impinging angle as a reflected signal with a predefined outgoing angle;

reflecting, via the RIS reflector, the incoming signal as the reflected signal towards a measurement application antenna when the incoming signal impinges onto the RIS reflector with a predetermined first angle and qualifying beamforming characteristics of the satellite for each one of a plurality of positions via at least one highly directive measurement application antenna and the RIS reflector, wherein the satellite emits a RF signal with a respective beamforming applied in each one of the plurality of positions.

17. The test method according to claim 16, wherein the method further comprising at least one of:

qualifying a beam directivity characteristic of the satellite based on the RF signals; or transmitting the RF signals to the satellite device under test via the RIS reflector and the respective measurement application antenna from the measurement application device.

18. The test method according to claim 16, wherein the RIS reflector is configured to comprise at least two reflection zones, wherein each one of the reflection zones is configured to reflect the incoming signal as reflected signal towards one measurement application antenna when the incoming signal impinges onto the respective reflection zone with a predetermined zone-specific angle.

19. The test method according to claim 18, at least one of:

wherein the at least two reflecting zones are each configured to reflect the incoming signal to the same measurement application antenna, and wherein a beam sweeping characteristic of the satellite is qualified based on the RF signals; or wherein the at least two reflecting zones are each configured to reflect the incoming signal to a different measurement application antenna, and wherein the RF signals are received from the satellite via the RIS reflector and the respective measurement application antennas, and wherein at least one of a simultaneous beam forming characteristic, a beam crosstalk characteristic, and a beam co-existence characteristic of the satellite is qualified based on the RF signals.

20. The test method according to claim 16, wherein the method further comprising at least one of:

qualifying a beam sweeping characteristic of the satellite based on the received RF signals; or transmitting the RF signals to the satellite via the RIS reflector and the respective measurement application antenna with the satellite being provided in the plurality of positions relative to the RIS reflector.

21. The test method according to claim 16, wherein the RIS reflector is configured to comprise at least one antenna reflection zone and at least one scattering zone, wherein each one of the antenna reflection zones is configured to reflect the incoming signal as reflected signal towards a measurement application antenna when the incoming signal impinges onto the respective antenna reflection zone with a predetermined zone-specific angle, and wherein each one of the scattering zones is configured not to reflect the incoming signal as reflected signal towards the respective measurement application antenna when the incoming signal impinges onto the respective antenna reflection zone with a predetermined zone-specific angle, wherein the method further comprising at least one of:

receiving the RF signals from the satellite via the RIS reflector and the respective measurement application antenna, and qualifying a beam pattern characteristic of the satellite based on the RF signals; or transmitting the RF signals to the satellite via the RIS reflector and the respective measurement application antenna.

22. The test method according to claim 16, wherein the beamforming characteristics of the satellite are qualified as erroneous, if at least one of an equivalent isotropically radiated power (EIRP) of the RF signals is below a predetermined threshold value, and an error vector magnitude (EVM) is above a predetermined threshold value.

23. A test system for testing a satellite device under test, the test system comprising:

a Reconfigurable Intelligent Surface (RIS) reflector configured to reflect an incoming signal from the satellite that impinges on the RIS reflector with a predefined impinging angle as a reflected signal with a predefined outgoing angle;

a measurement application antenna, wherein the RIS reflector is configured to reflect the incoming signal as a reflected signal towards the measurement application antenna when the incoming signal impinges onto the RIS reflector with a predetermined first angle, wherein at least two reflecting zones of the RIS reflector are each configured to reflect the incoming signal to the measurement application antenna; and a measurement application device configured to receive RF signals from the satellite via the RIS reflector and the measurement application antenna and configured to qualify a beam sweeping characteristic of the satellite based on RF signals exchanged between the measurement application device and the satellite via the measurement application antenna and the RIS reflector, wherein the measurement application device is configured to qualify the beam sweeping characteristic of the satellite for each one of a plurality of positions where the satellite emits a RF signal with a respective beamforming applied in each one of the plurality of positions.

* * * * *